Feb. 20, 1962 — M. BARRERE ET AL — 3,021,710
FLOW METER
Filed March 8, 1954 — 2 Sheets-Sheet 2

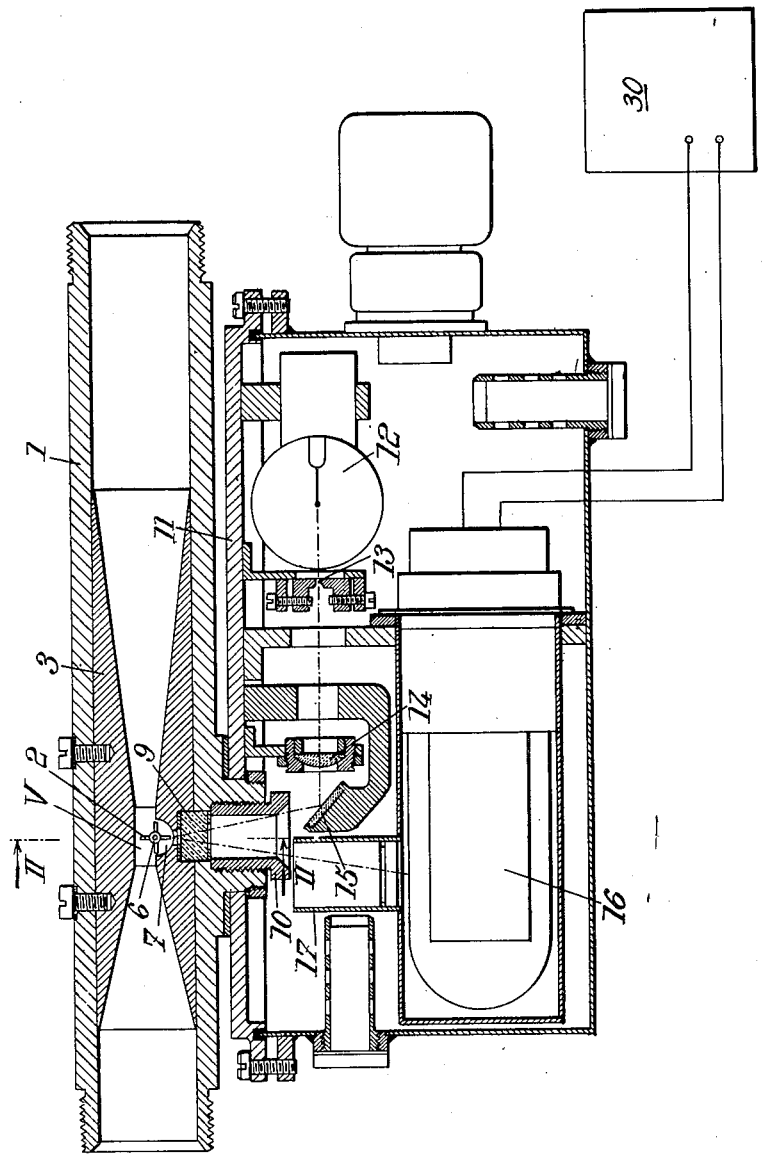

INVENTOR
Marcel Barrere
André Moutet
BY Bailey, Stephens
and Huettig
ATTORNEY

3,021,710
FLOW METER
Marcel Barrere and André Moutet, Villaine par Massy, France, assignors to "Office National d'Etudes et de Recherches Aeronautiques" (O.N.E.R.A.), Chatillon-sous-Bagneux, France, a society of France
Filed Mar. 8, 1954, Ser. No. 414,744
Claims priority, application France Mar. 12, 1953
1 Claim. (Cl. 73—229)

The present invention relates to rate of flow meters, that is to say apparatus for measuring the rate of flow of a fluid stream, and it is more especially concerned with apparatus of this kind for measuring the rate of flow of a liquid, and in particular of one of the liquid components of a two component fuel for a rocket-engine.

The object of our invention is to provide an apparatus of this kind which is better adapted to meet the requirements of practice than those used at the present time, in particular concerning accuracy and time of response.

Such apparatus includes a conduit through which the fluid stream the rate of flow of which is to be measured is caused to flow. According to our invention, in a portion of this conduit where the velocity of the fluid stream is increased through suitable means, for instance by throttling the conduit, we provide at least one member of very low inertia movable about an axis at right angles to the direction of flow and arranged to be displaced by said fluid stream in accordance with the rate of flow, said movable member being advantageously constituted, when the fluid is a liquid, by a hydrodynamic meter wheel, and we combine with said member means for analyzing the effect of the fluid stream on said movable member, which means are preferably arranged in such manner that a light beam directed onto said member has its characteristics influenced by said member, said beam being in particular, when the movable part is a meter wheel, disposed so as to strike the ends of the blades of said wheel at a given point of their travel so as to be reflected toward a detector system which then records a series of signals corresponding to the successive passages of said blades at said point.

Preferred embodiments of our invention will be hereinafter described, with reference to the accompanying drawings, given merely by way of example, and in which:

FIG. 1 is a longitudinal section of a rate of flow meter for liquids, made according to our invention.

The specific apparatus which will now be described is well adapted to the measurement of the rate of flow of one liquid component (nitric acid, liquid oxygen, for instance) of a two component fuel for a rocket-engine.

Our apparatus includes a conduit 1 through which the whole or a portion of the fluid stream the rate of flow of which is to be measured is passing, this conduit being mounted either in series or in parallel in the main stream flow according as it is the whole or a portion of said stream that is to pass through the apparatus.

In a portion of conduit 1 where the velocity is to be increased, there is provided a meter wheel 2 having its axis at right angles to the direction of flow, said wheel being of very low inertia, advantageously for instance of a weight averaging one tenth of a gram, mounted so as to be rotated by the liquid stream. Calculation shows that the speed of this meter wheel under the effect of the hydrodynamic forces which are acting thereon is practically proportional to the rate of flow of the liquid.

In combination with this arrangement, means (preferably optico-electronic means) are provided for measuring the speed of revolution of meter wheel 2.

Preferably, meter wheel 2 is located in the throat V of a Venturi (convergent-divergent) which may be of conical shape as shown by FIG. 1, this arrangement being suitable when the rates of flow to be measured are relatively low, averaging for instance from 5 to 150 grams per second.

Figure 3:
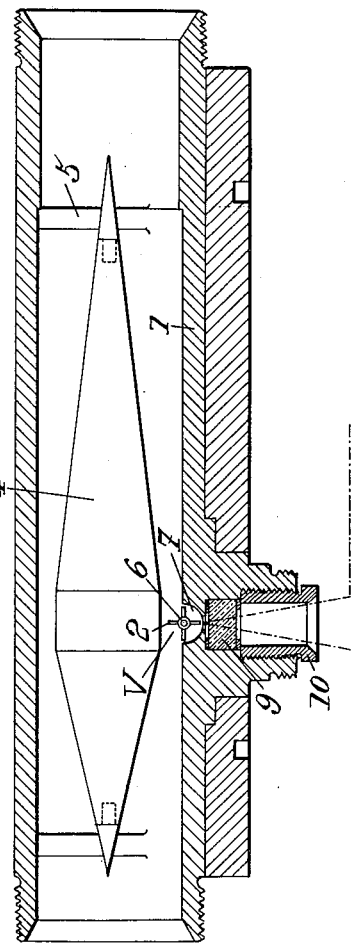
FIG. 3 is a longitudinal section of a modification of the portion of the apparatus through which the liquid is flowing.

We may also, according to a modification illustrated by FIG. 3, make use of an annular arrangement forming a throat in conduit 1 analogous to that of the Venturi of FIG. 1, this being especially advantageous for the measurement of higher rates of flow, for instance 6 kilograms per second.

In the first of the two cases above referred to (FIGS. 1 and 2), the Venturi is constituted by fitting in conduit 1 a convergent-divergent nozzle 3 the external diameter of which corresponds to the inner diameter of said conduit. In the second case (FIG. 3), we mount in conduit 1, a body 4 in the form of two opposed cones having adjacent bases, said body 4 being held by arms 5 and limiting, together with the inner wall of conduit 1, a convergent-divergent annular passage.

By way of indication, very good results were obtained with a Venturi in which the ratio to each other of the minimum and maximum diameters was 0.2 and the apex half-angles of the convergent and divergent portions were respectively 14° and 7°.

In both cases, the element (nozzle 3 or body 4) which limits the convergent-divergent passage is advantageously made removable so as to make it possible to adapt the apparatus to different conditions of experimentation.

The meter wheel 2 may for instance include four flat blades forming between them four dihedral angles equal to 90°. This wheel 2 is mounted so that its supporting means are outside of the stream of liquid. For instance, its spindle 6 is advantageously tangent to the throat V, whereby for a full revolution of the wheel, every blade thereof circulates for half a revolution in the liquid stream and, for the next half-revolution, in a recess 7 provided for this purpose in the side wall of the Venturi.

Preferably, the length of the blades is greater than one half of the transverse dimension (either circular or annular) of the throttled portion of the passage.

Figure 4:
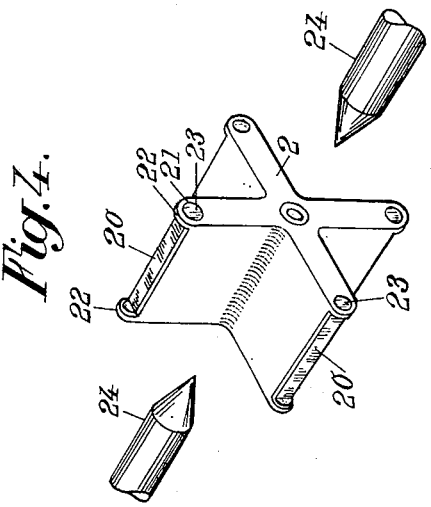
FIG. 4 is a detail view of the meter wheel.
Figure 2:
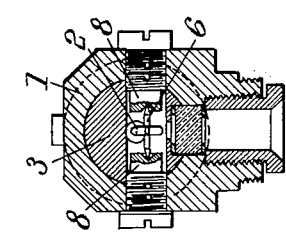
FIG. 2 is a cross section on the line II—II of FIG. 1 of the portion of the meter through which passes the liquid stream the rate of flow of which is to be measured.

The meter wheel may be mounted as shown by FIG. 2, the ends of the spindle 6 of said wheel forming pivots held by screws 8 the ends of which are suitably recessed to receive said spindle.

By way of indication, concerning the material of which the parts are to be made, good results were obtained as to resistance to corrosion, for the construction of an apparatus to be used with oxidizing liquids, by using stainless steel to constitute the whole of conduit 1, of the Venturi, and the meter wheel 2, the packing joints being then made of polyvinyl chloride.

The optico-electronic means for measuring the speed of meter wheel 2 are preferably arranged in such manner that a light beam strikes, at a given point of its passage, at least one element rotating together with meter wheel 2 and capable of reflecting said light beam toward a detector system which records a series of signals the frequency of which is proportional to the speed of the meter wheel.

In order to reduce the weight of said wheel, the reflector elements are advantageously constituted by the edges of the blades of said wheel, which are suitably polished.

However, preferably, meter wheel 2 is made of a plastic material, for instance a tetrafluor-ethylene resin and the end of every blade thereof carries a reflecting surface 20. This reflecting surface is obtained by drilling in every blade a hole 21 parallel to the blade edge and close thereto, and engaging into each of said holes a stainless steel wire 23 which fits closely therein. Every edge is then cut off (with the exception of small portions 22 at the ends thereof) along a plane passing through the axis of the steel wire 23.

This wheel 2 is journalled on two sharp points 24 of stainless steel engaged in steel bearings.

Such a construction is very strong. A wheel made as above described was run at more than 36,000 revolutions per minute for one month without showing any appreciable wear.

In the construction illustrated by the drawing, we provide, in the wall of conduit 1, opposite meter wheel 2 and as close as possible thereto, a window 9, for instance of glass or quartz, fixed in position by a locking tube 10. The casing 11 of the apparatus contains a light source 12 which projects, through an adjustable slot 13, a light beam across the path of which is provided an optical system (constituted for instance by a convergent lens 14 and a plane mirror 15) which causes said beam to strike with a given incidence every blade edge passing opposite window 9, whereby said beam is then reflected by said blade edge.

The reflected light beam is received in a electron multiplier photo-tube 16, that is to say an optico-electronic apparatus, well known in itself, capable of giving voltage impulses in response to the successive signals corresponding to the reflection of the light beam by the edges of the successive blades passing opposite window 9, so that the frequency of these signals is thus known.

The voltage impulses supplied by said phototube 16 are fed to an electrical indicating apparatus which gives the number of signals per unit of time. This apparatus which is diagrammatically shown at 30 on FIG. 1 may be of any suitable type as well known in the art and for instance as illustrated on FIG. 2 and described in the specification of the U.S. Patent No. 2,623,389 to T. Van Oosterom.

In order to avoid a prejudicial influence of the light issuing from light source 12 on the reflected beam, we provide an opaque tube 17 surrounding said beam.

All the parts above described are fixed as rigidly as possible to casing 11 so that the whole apparatus can be handled without special precautions and is practically unresponsive to vibrations of the conduit during experiments, the walls of said casing protecting the parts contained therein against accidental projections of corrosive liquids.

Advantageously, conduit 1 (which contains the Venturi and the meter wheel) is connected to casing 11 (which contains the measurement means proper) through detachable fixation means, so that the measurement apparatus can be used at will with different kinds of conduits 1, for instance with a conduit with a central Venturi, as in FIG. 1, or with a conduit with an annular Venturi, as in FIG. 3.

An apparatus as above described has many advantages among which we may cite the following ones:

Its simplicity and therefore its safety of operation and its relatively low cost;

The fact that the meter wheel introduces in the fluid stream but insignificant pressure drops and disturbances, this advantage being due on the one hand to the fact that the meter wheel is placed in the throat of the Venturi and on the other hand to the fact that a portion of its mass and the whole of its support means are located outside of the fluid stream;

Its very low time of response (lower than 1/100 of a second) which is independent of the direction of variation of the rate of flow, this being due to the low inertia of the meter wheel and to its good balancing;

Its accuracy, which averages 1 percent, this accuracy being considered of course once the apparatus has been tested;

Its capacity of working within a very wide range of pressures, without the adjustment of the apparatus having to be modified, this advantage being due to the low drag of the meter wheel which is practically zero;

Its wide range of use (from the point of view of the flow rates to measure), this advantage being further increased by the possibility, with a same group of instruments contained in body 11, of using different types of Venturis;

And its unsensitiveness to hydrodynamic shocks.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claim.

What we claim is:

A liquid rate of flow meter which comprises, in combination, a structure forming a conduit for conveying a stream of the liquid under pressure the rate of flow of which is to be measured, said conduit being constricted to form a throat, the portions of said conduit respectively upstream and downstream of said throat being of gradually varying cross section, one side of said throat being provided with a housing, a bladed wheel made of a plastic material and including several radial blades of substantially rectangular shape the outer edge of each of said blades parallel to the axis of said wheel being provided with a groove running along said edge and of a width nearly equal to the thickness of said blade, a stainless steel rod housed in each of said grooves with a light reflecting flat face flush with said edge, said wheel being pivoted in said conduit with its axis at right angles to the direction of said condut and substantially tangent to the surface of said throat, means forming a transparent window in said conduit opposite said throat to enable light from the outside of said conduit to strike said meter wheel, a source of light, optical means for directing through said window a beam from said source onto the edges of the blades of said meter wheel as they pass at a given point, and optico-electronic means responsive to said light beams for measuring the number of light beams reflected per unit of time from said blade edges as they are passing at said point.

References Cited in the file of this patent
UNITED STATES PATENTS

| | | |
|---|---|---|
| 114,415 | Cremin | May 2, 1871 |
| 918,097 | Speed et al. | Apr. 13, 1909 |
| 1,126,275 | Rice | Jan. 26, 1915 |
| 2,037,278 | Siber | Apr. 14, 1936 |
| 2,326,169 | Piquerez | Aug. 10, 1943 |
| 2,623,389 | Van Oosterom | Dec. 30, 1952 |
| 2,709,366 | Potter | May 31, 1955 |
| 2,723,562 | Lutz et al. | Nov. 15, 1955 |

FOREIGN PATENTS

| | | |
|---|---|---|
| 15,073 | Great Britain | 1909 |
| 466,004 | Great Britain | May 20, 1937 |
| 606,278 | Great Britain | Aug. 11, 1948 |